(12) United States Patent
Butvin et al.

(10) Patent No.: US 9,316,247 B2
(45) Date of Patent: Apr. 19, 2016

(54) FEED MECHANISM FOR SWAGABLE LOCKBOLT COLLARS

(71) Applicant: GAGE BILT, INC., Clinton Township, MI (US)

(72) Inventors: Joseph Butvin, Strongsville, OH (US); Bruce T. Godfrey, Royal Oak, MI (US); Brian H. Leigh, Macomb, MI (US); Tony P. Potts, Warren, MI (US)

(73) Assignee: Gage Bilt, Inc., Clinton Township, MI (US)

( * ) Notice: Subject to any disclaimer, the term of this patent is extended or adjusted under 35 U.S.C. 154(b) by 389 days.

(21) Appl. No.: 13/744,814

(22) Filed: Jan. 18, 2013

(65) Prior Publication Data

US 2014/0201972 A1 Jul. 24, 2014

(51) Int. Cl.
| | |
|---|---|
| F16B 39/284 | (2006.01) |
| B23P 19/00 | (2006.01) |
| B21J 15/32 | (2006.01) |
| B65G 1/02 | (2006.01) |
| B21J 15/02 | (2006.01) |
| B65G 51/02 | (2006.01) |
| B23P 19/06 | (2006.01) |
| B23P 19/08 | (2006.01) |

(Continued)

(52) U.S. Cl.
CPC .............. *F16B 39/284* (2013.01); *B21J 15/022* (2013.01); *B21J 15/32* (2013.01); *B21J 15/326* (2013.01); *B23P 19/003* (2013.01); *B65G 51/02* (2013.01); *B21J 15/105* (2013.01); *B21J 15/38* (2013.01); *B23P 19/002* (2013.01); *B23P 19/005* (2013.01); *B23P 19/006* (2013.01); *B23P 19/06* (2013.01); *B23P 19/08* (2013.01); *B25B 23/06* (2013.01); *F16B 19/05* (2013.01); *Y10T 29/49956* (2015.01); *Y10T 29/535* (2015.01); *Y10T 29/53496* (2015.01)

(58) Field of Classification Search
CPC ........ B21J 15/022; B21J 15/105; B21J 15/12; B21J 15/32; B21J 15/326; B21J 15/38; B23P 19/001; B23P 19/002; B23P 19/003; B23P 19/004; B23P 19/005; B23P 19/006; B23P 19/06; B23P 19/08; B25B 23/06; B25B 28/00; B65G 51/02; F16B 19/05; F16B 39/28; F16B 39/284; Y10T 29/49948; Y10T 29/4995; Y10T 29/49952; Y10T 29/49954; Y10T 29/49956; Y10T 29/49957; Y10T 29/53478; Y10T 29/53487; Y10T 29/53496; Y10T 29/535; Y10T 29/53513; Y10T 29/53522

See application file for complete search history.

(56) References Cited

U.S. PATENT DOCUMENTS

| 4,417,688 A | 11/1983 | Schnaibel et al. |
| 4,852,376 A | 8/1989 | Suhov |

(Continued)

*Primary Examiner* — Ryan J Walters
*Assistant Examiner* — Matthew P Travers
(74) *Attorney, Agent, or Firm* — Young Basile Hanlon & MacFarlane P.C.

(57) ABSTRACT

An air-driven feeder tool is provided for presenting swagable collars one at a time for placement on the shanks of lockbolts and thereby made ready for the application of a swaging tool. The swaging tool breaks off a pintail from the lockbolt and a vacuum system draws the broken-off pintails through a vacuum device and into a receptacle for safe disposal. The feeder mechanism comprises a magazine holding a supply f side-by-side collars, a presentation piece holding a short working collars and a worker-actuable trigger mechanism between the two queues for transferring collars, one at a time, from the magazine to the presentation queue. Two embodiments of the feeder tool are disclosed, each with a unique trigger position.

14 Claims, 8 Drawing Sheets

(51) Int. Cl.
*F16B 19/05* (2006.01)
*B25B 23/06* (2006.01)
*B21J 15/10* (2006.01)
*B21J 15/38* (2006.01)

(56) References Cited

U.S. PATENT DOCUMENTS

| | | |
|---|---|---|
| 5,142,774 A | 9/1992 | Jeffery |
| 5,167,327 A | 12/1992 | Mondello |
| 5,385,434 A * | 1/1995 | Quinn et al. .................... 406/73 |
| 5,490,311 A * | 2/1996 | Rosier ....................... 29/243.523 |
| 5,697,521 A | 12/1997 | Dixon |
| 6,253,448 B1 | 7/2001 | Zieve et al. |
| 6,907,648 B2 * | 6/2005 | Eldessouky .............. 29/243.525 |
| 2011/0252626 A1 * | 10/2011 | Williams ................... 29/525.01 |
| 2011/0289769 A1 * | 12/2011 | Skolaude ........................ 29/809 |
| 2013/0247890 A1 * | 9/2013 | Gilley .......................... 124/51.1 |

\* cited by examiner

FEED MECHANISM FOR SWAGABLE LOCKBOLT COLLARS

FIELD OF THE INVENTION

The invention relates to the installation of lockbolt fasteners having shanks adapted to receive swagable collars and more particularly to a device for presenting collars, in sequence, for location on lockbolt shanks such that a swaging tool can thereafter be applied to secure the collars to the lockbolt shanks. In addition, a device is provided for collecting lockbolt pintails broken off by the swaging tool.

BACKGROUND OF THE INVENTION

Lockbolts of the type having grooved or threaded shanks adapted to receive a swagable metal collar have been known and in widespread use since at least as early as the application date of U.S. Pat. No. 2,521,048 incorporated by reference into expired U.S. Pat. No. 4,852,736 assigned to Huck Manufacturing Company. A typical lockbolt comprises a head and a shank extending from the head. In some cases, the shank is divided into two axially-spaced portions separated by a fracture groove. The portion closer to the head is provided with convolutions or grooves, onto which a collar is swaged. The shank portion farther from the head is called a "pintail" and is broken off by a puller within the swaging tool.

In practice, lockbolts are placed in holes preformed in the workpieces to be joined. Thereafter, a worker assigned to finish the installation of the lockbolts places collars on a number of lockbolt shanks and then applies the swaging tool to set the collars and, where applicable, break off the pintail. This is done lockbolt-by-lockbolt in sequence. A worker typically swages collars in groups of, for example, 6 to 12 collars, and then rests his or her arms by lowering the swaging tool and placing collars on the next set of lockbolts to be finished. We refer to the swaging of a group of lockbolt collars in one tool-handling time as a "cycle", it being understood that most fastening jobs involve a number of such cycles.

As a practical matter, there are several problems that can crop up in the field. The first arises out of the fact that the article being constructed is sometimes above the worker's head, and the lockbolt shanks may be vertical. Even if a sticky substance like rubberized cement is used to hold the unswaged collars in place, the swaging process may still cause collars to fall off of the lockbolt shanks before they are swaged. In aircraft applications, dropped collars must be scrapped. This not only reduces the efficiency of the lockbolt installation process, but also requires a worker to prevent dropped collars from becoming "foreign object debris" (FOD).

Another problem which often arises in the field is the collection and disposal of lockbolt shank pintails broken off during the swaging step. The typical tool simply ejects pintails without any kind of organization or collection function. Ejected pintails often collect on or around the workpiece or fall on the floor where they present a safety hazard. This is another potential source of FOD. Moreover, normal collection further reduces lockbolt installation efficiency.

SUMMARY OF THE INVENTION

A first aspect of the invention subject matter disclosed herein is a handheld collar feeder tool capable of presenting swagable lockbolt collars singly or serially in groups. In an illustrative embodiment hereinafter described in detail, the collar feeder comprises a handheld tool with a trigger that allows an operator to load a number of collars from a large capacity magazine into a feeder tool queue ready to be fitted into lockbolts. A worker performs the loading function by transferring collars from the magazine into the tool queue using a transfer mechanism built into the feeder tool. The tool is configured to present each collar in the loaded queue in such a way as to allow the worker to place the collar onto a lockbolt shank. The worker then fits a swaging tool onto the collar and swages it onto the lockbolt. The next collar in the loaded queue, if there is one, then moves into the presentation position. The worker completes a cycle and reloads the queue.

In the embodiments described herein, the tool is configured such that the fully-loaded queue holds about 5-15 collars, the number that experience shows a worker can comfortably install in one cycle. The worker can reload the queue, fully or partially, between each swaging cycle simply by activating the tool trigger. These numbers are given by way of example only.

In the form described and illustrated herein, the magazine queue and the feeder tool queue are offset from one another in the queue. Collars are transferred, one at a time, from the top of the magazine to the tool queue by repeatedly depressing a trigger to toggle a slide. Because both the magazine and the handheld tool are connected to a source of pressurized air, the collars in the main magazine are constantly being urged toward the slide mechanism while the collars transferred to the tool queue are constantly being urged toward the presentation end of the tool. The presentation end of the feeder tool can be configured to suit the particular work in progress. Air pressure controls may be provided.

According to a second aspect of the invention, means are provided for systematically collecting and disposing of pintails broken off from lockbolt fasteners on which collars are swaged. In accordance with this aspect of the invention, a swaging/pulling tool that normally ejects broken-off pintails is provided with a conduit which receives ejected pintails, one at a time, and delivers the pintails by vacuum to a container for pintails in an organized and safe fashion in the illustrated embodiment, a conduit runs from the swaging tool to and through a vacuum generator that provides for the movement of pintails from swaging tool to the container.

Other aspects of the invention disclosed herein comprise methods of using the aforementioned collar feed and pintail collection devices, either together as part of a system, or individually.

Still further advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
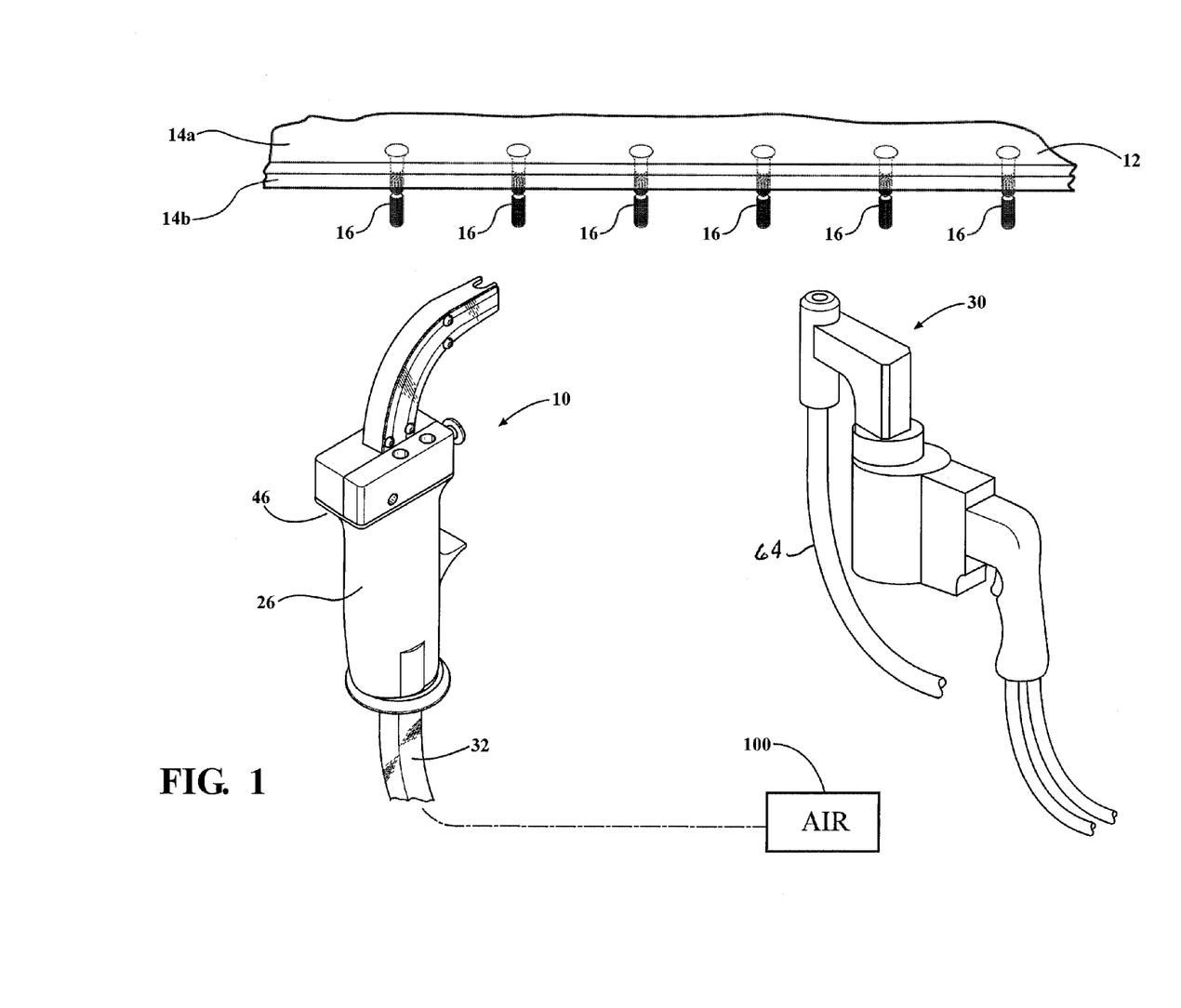
FIG. 1 is a schematic diagram of a lockbolt installation system including a first collar feeder and a swaging tool for installing collars on the shanks of vertically oriented lockbolts in a workpiece.

Referring to the drawings, and particularly to FIG. 1, there is shown a two-part system for installing lockbolts in a workpiece 12 that, in this case, is shown simply as two sheets 14a and 14b of metal to be fastened together. The sheets may, for example, be aluminum sheets. The sheets are joined together by lockbolts 16 of the "pintail" type. The system for installing lockbolts 16 comprises a feeder tool 10 for placing swagable metal collars 28 (FIG. 5) onto the exposed shanks of lockbolts 16, and a swaging tool 30 having a pintail collection feature including a vacuum conduit 64 further described herein with reference to FIG. 6. While the system of FIG. 1 works to best advantage when both tools 10 and 30 are present, tool 10 may be used with any swaging tool, and the pintail collection system associated with tool 30 may be used without the feeder tool 10. Tools 10 and 30 are provided with pressurized air by a regulated supply 100 that may be part of a power unit such as the GB904V available from Gage Bilt, Inc. of Clinton Township, Mich.

Figure 5:
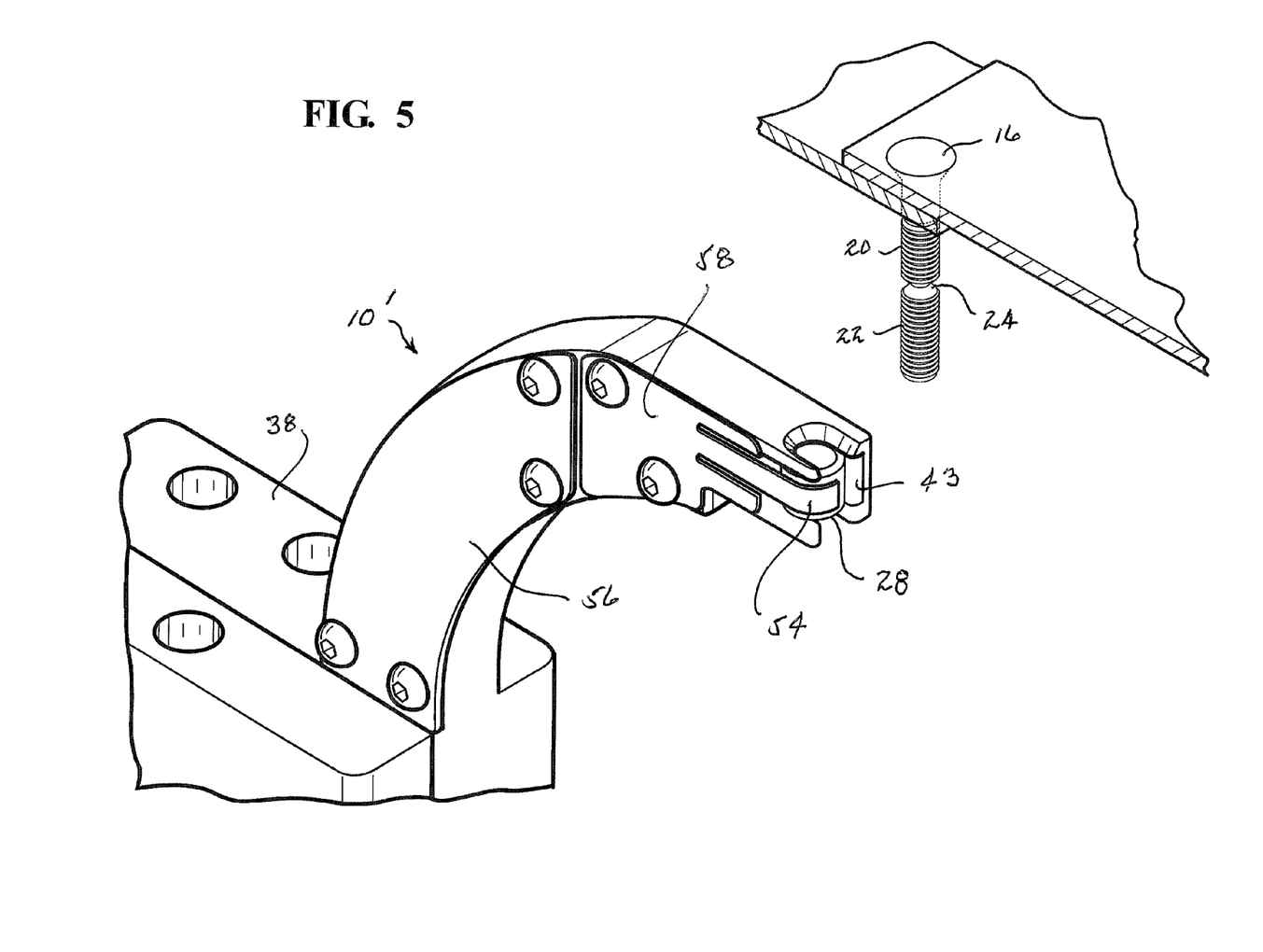
FIG. 5 is a detailed view of the feeder tool of FIG. 2 and a lockbolt ready to receive a collar.

As shown in FIG. 5, each lockbolt 16 comprises a shank divided into two axially contiguous grooved portions 20 and 22; the grooves may be annular or helical. The grooves on the upper portion 20 receive material from metal collars 28 that are swaged onto the upper shanks by tool 30. The grooves on the lower shank portion 22 provide grip for the puller section of the tool 30. Between the two shank portions 20, 22 is a fracture groove 24 that causes the lower shank portion 22 to break off as part of the installation process. The material of the collars 28 is softer than the material of the lockbolt shank such that the swaging tool 30 deforms the collar radially inwardly into the grooves on shank portion 20, locking the collar 28 to the shank of the lockbolt 16 and serving effectively as a non-removable nut. The tool 30 performs the function of pulling on the lockbolt shank while swaging the collar, thus urging the two layers or sheets 14a, 14b together. The pulling step ultimately breaks the lower or "pintail" portion 22 of the shank off at groove 24.

As shown in FIG. 1, the lockbolts 16 are typically arranged on the work 12 in rows with spacings that can vary considerably but may, in a typical situation, be approximately two to four inches apart. Although only six lockbolts 16 are shown in FIG. 1, it is to be understood that the normal work situation may involve hundreds of lockbolts to be installed.

Figure 2:
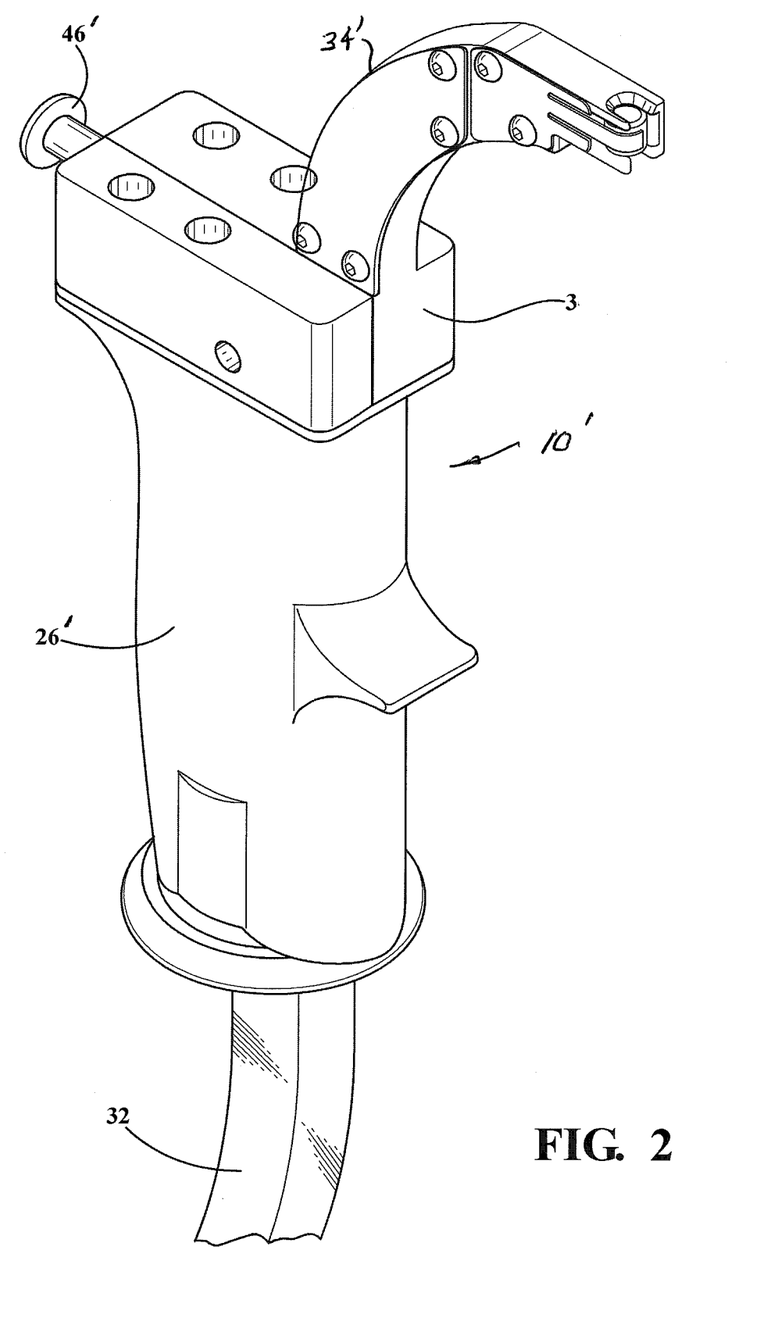
FIG. 2 is a perspective section of an alternative collar feeder also having a curved end piece for holding a group of collars in a queue and presenting them to a lockbolt shank.

Referring to FIGS. 2 through 5, two different feeder tools are shown. Tool 10 has a front rear-mounted, index finger-operated trigger while tool 10' has a rear, thumb-finger-operated trigger. The difference in trigger position gives rise to other internal differences as hereinafter explained. The overall functions of tools 10 and 10' are, however, very much the same: they receive collars 28 from an attached magazine tube 32 to fill a queue within a curved end piece for placement on lockbolts. In FIGS. 2 and 3A, the collar feed tool 10' comprises a grip body 26' adapted to receive a collar supply magazine in the form of a clear plastic magazine tube 32 having an interior channel 37 that is rectangular in cross-section. The magazine tube 32 is long enough to hold from, for example, 50 to 200 collars in side-by-side adjacent relationship. The interior dimensions of the channel 37 are such as to provide a low-friction fit, but are tight enough to prevent the collars from tumbling or cocking while within the magazine. The magazine queue is sometimes referred to as a "supply queue" in this document.

Collars 28 are loaded into the magazine tube 32, after which the tube is connected to the tool 10 or 10' by insertion into a passage 39 and to a source of air pressure which urges the collar stack toward the tool. The source is preferably regulated so as to neither underdrive nor overdrive the collars toward the tool. The collars are pushed by air toward a transfer mechanism within the grip 26' as hereinafter described. A quick connect feature (not shown) may be used to join the magazine 32 to the tool in such a way as to hold it securely in use, but allow easy removal for reloading and service.

Figure 3A:
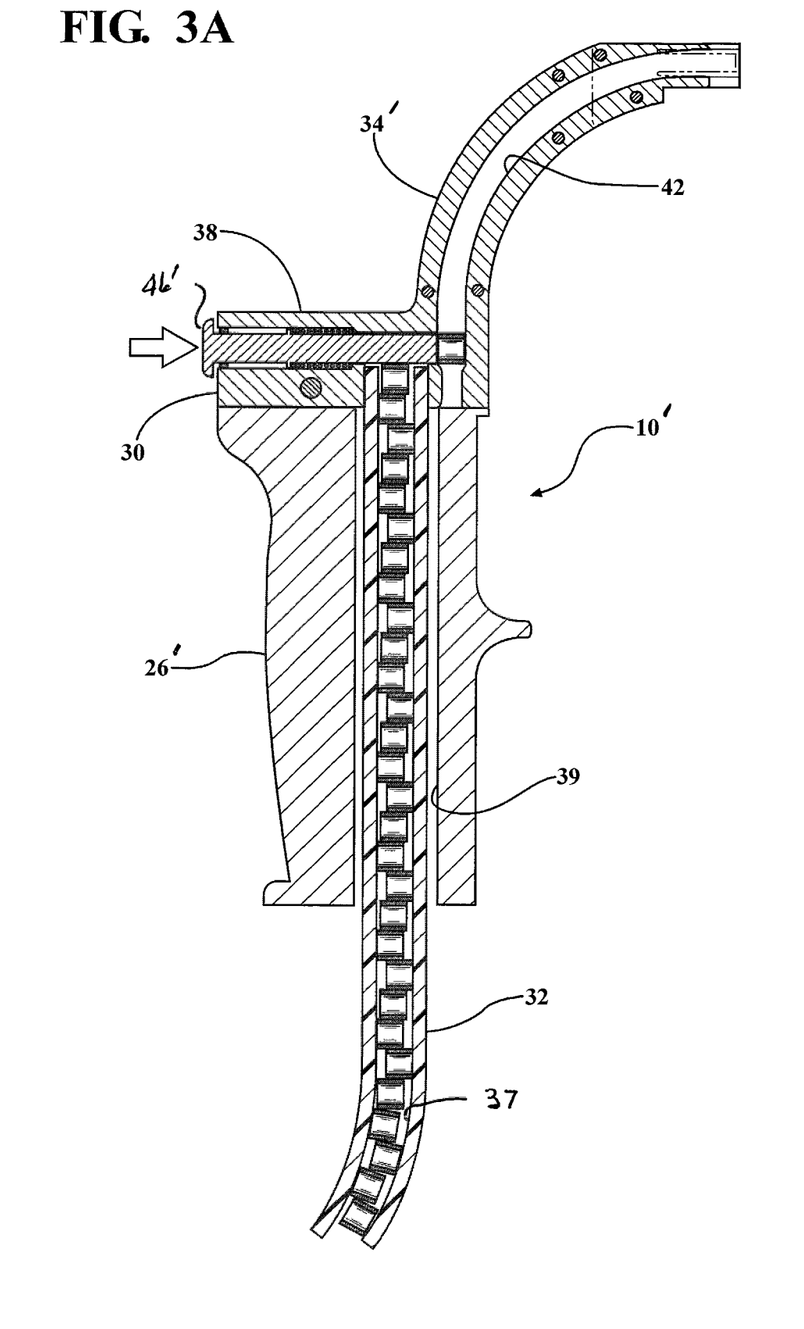
FIG. 3A is a cross-sectional view of the collar feeder of FIG. 2 showing the details of the trigger and slide mechanisms that are used to load the queue.
Figure 4A:
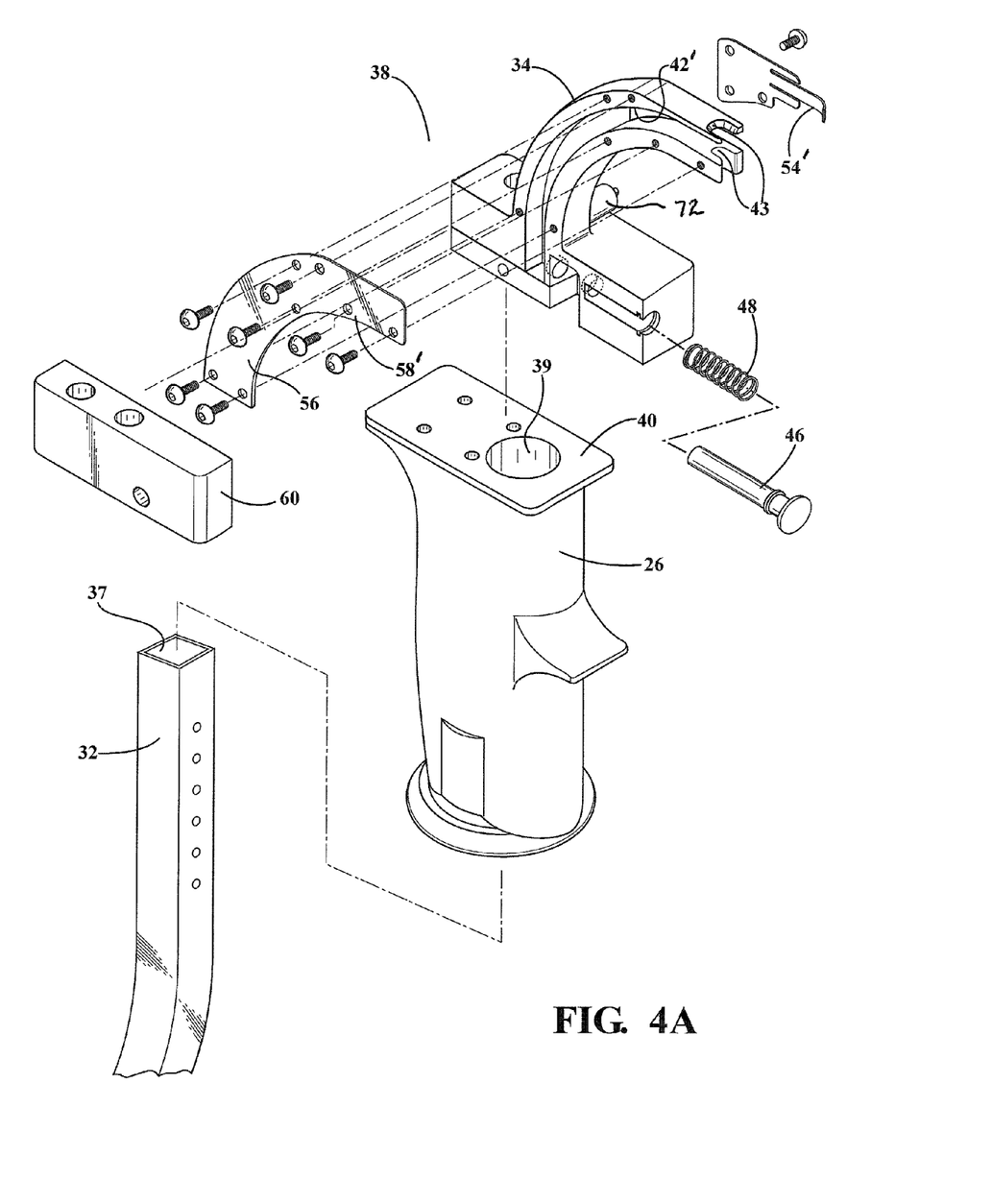
FIG. 4A is an exploded view of the feeder of FIG. 3B.
Figure 4B:
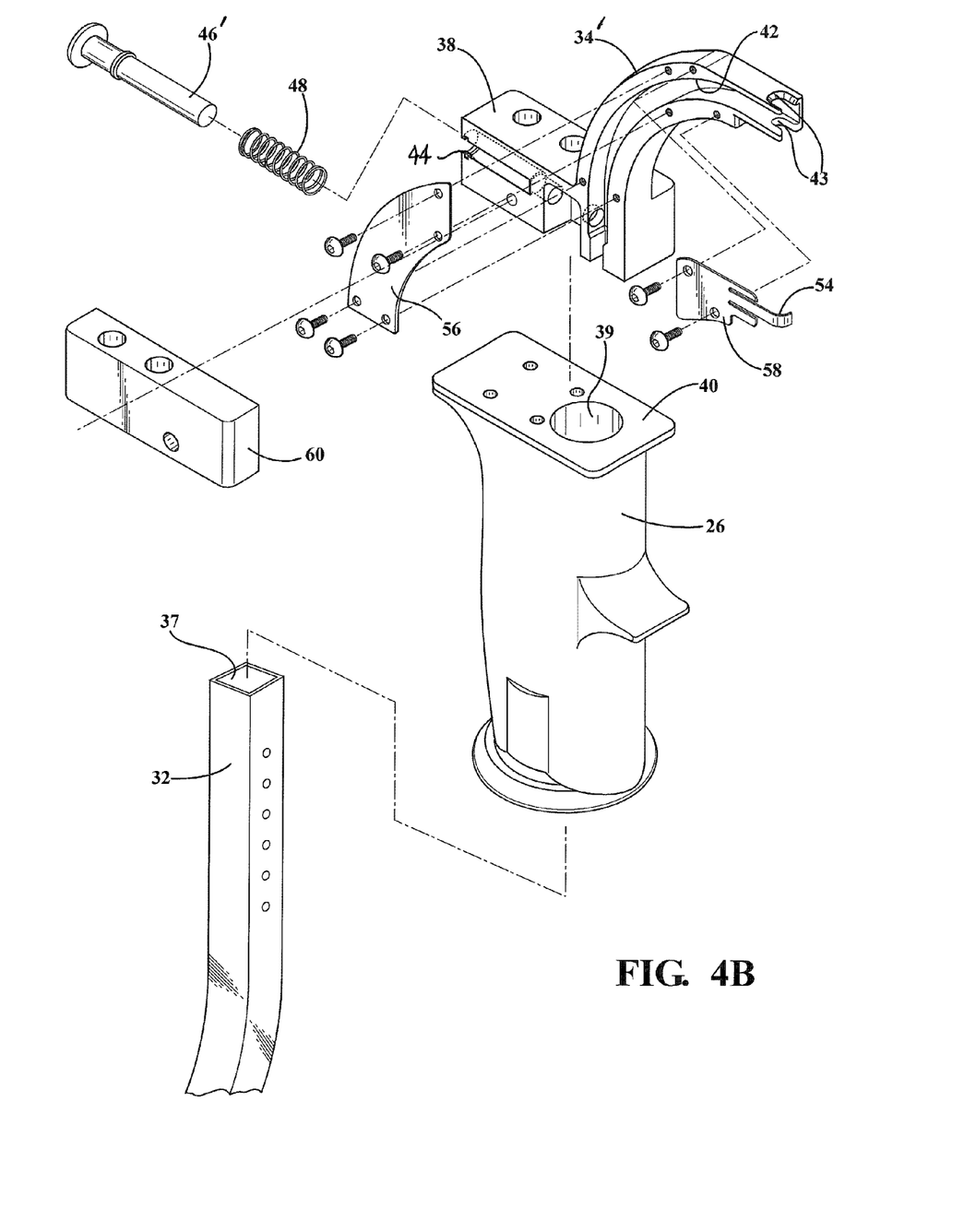
FIG. 4B is an exploded view of the feeder tool of FIG. 3A.

Referring to the embodiment of FIGS. 2, 3A and 4B, the tool 10' comprises an upper body 30 having two main sections: a transfer section 38 that bolts onto the grip 26' and an integral, curved end piece 34' having an interior channel 42 long enough to hold a working queue of 5 to 15 collars for a cycle of installations. Transfer section 38 has a slidebolt passage 44 to receive a trigger/slidebolt 46' and a bias spring 48. Slidebolt 46' has an exposed end and provides a plunger-type trigger an operator can depress repeatedly to transfer collars from the magazine supply queue to the working queue within tool 10'. The slidebolt passage 44 communicates with the magazine passage 39 and the end piece passage 42. The passages 39, 42 are offset from one another. Accordingly, the trigger/slidebolt 46' can transfer collars, one at a time, from passage 39 to passage 42 until the end piece 34 is loaded to the worker's satisfaction. The air pressure bleeding from magazine tube 32 into tool 10' moves each collar up to the end 43 of end piece 34'.

The number of collars needed to fill the working queue can vary, but can be chosen to match or slightly exceed the number of collars a worker can comfortably swage in a cycle of tool handling. This can be, for example, from 5 to 15 collars. After holding the feeder tool 10' in the left hand and the swaging tool in the right hand and raising both of them to a work position long enough to place and swage 8 or 10 collars, the typical worker is ready to lower the tools and relax his or her arms for a few moments. The working queue in the track piece 34' can be refilled during this rest period. These numbers are all given by way of example and are not limiting.

The slidebolt passage 44 is closed by jaws 60. The channel 42 is covered by plates 56 and 58. Plate 56 can be metal or, preferably, a clear plastic that allows the worker to see how many collars are in the working queue. Plate 58 incorporates an integral retainer spring 54 that wraps around the open end of the piece 34' to prevent the escape of collars 28 until the worker pulls the tool 10' away from a lockbolt shank. Both plates 56, 58 are held in place by machine screws. The end of piece 34' is relieved as shown to expose the trough-bore of the collar in the presentation position.

To summarize, the magazine tube 32 provides a supply queue of collars 28 to be installed whereas the tool 10' can be loaded up with only as many collars as the worker is comfortable installing in a single cycle of tool manipulations. The trigger 46' is repeatedly pressed by the worker to transfer collars 28 from the supply magazine 32 to the working queue in the track piece 34' between each installation cycle or whenever he/she chooses. Air pressure urges the collars from the magazine toward the end of the tool 10'. The end piece 34' need not have the curved configuration illustrated, but can be designed to fit a particular job by presenting collars in an orientation that allows them to be transferred onto a lockbolt shank.

Figure 3B:
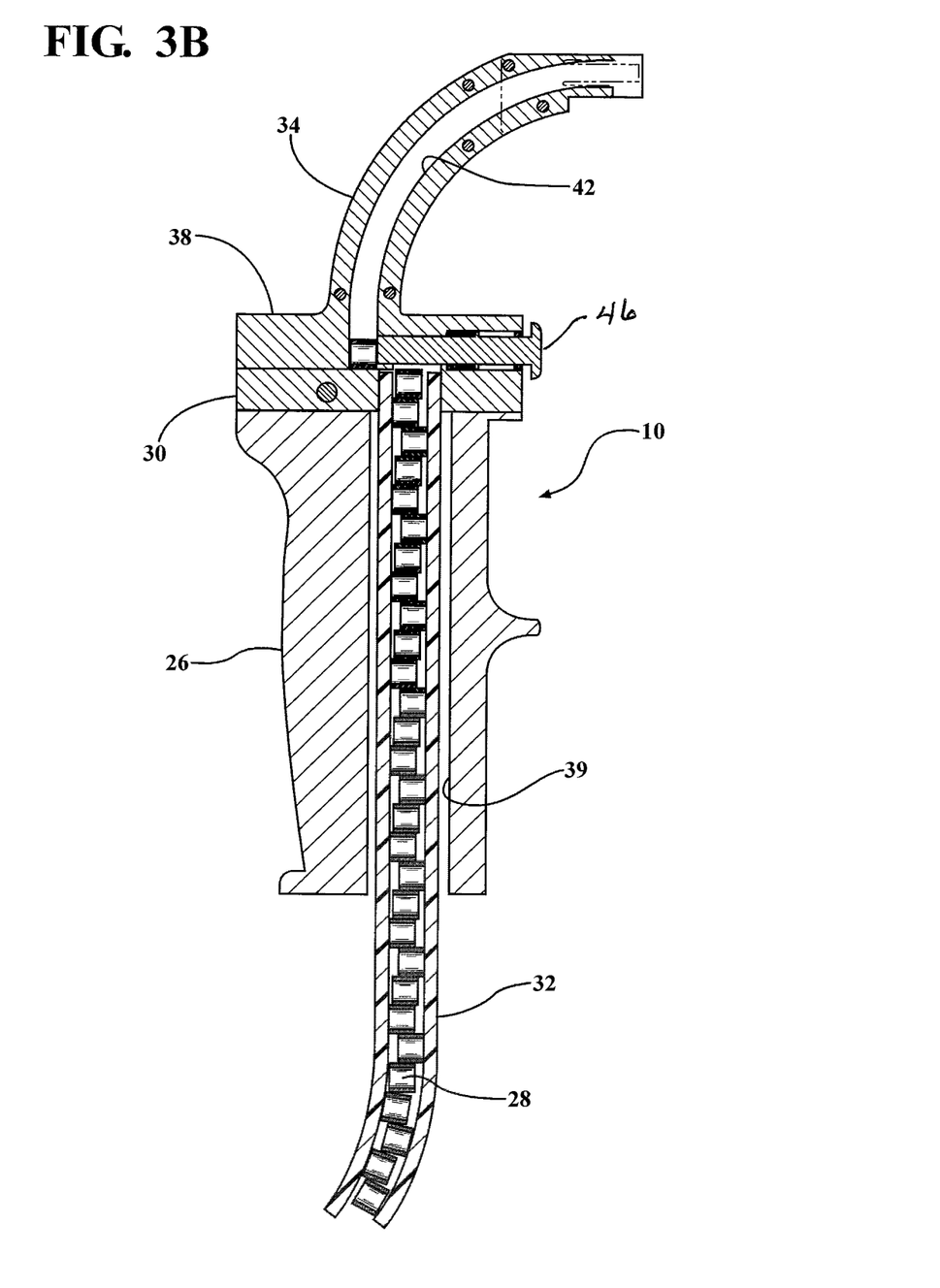
FIG. 3B is a cross-sectional view of the collar feeder of FIG. 1.

FIGS. 1, 3B and 4A show a different, preferred embodiment of the tool 10. The main difference in this embodiment is the relocation of the trigger 46 to the front of the tool where it can be operated by a worker's index finger. The trigger 46 still functions as a spring-based slide to move collars 28, one at a time, from the magazine channel to the tool queue 42 to load the end piece 34 as desired. As shown in FIG. 3B, the end piece 34 is reconfigured so the channel 42 is moved to the rear of the magazine channel or passage 39.

Another set of differences between tools 10 and 10' is shown in FIG. 4A. The channel 42' is covered by a clear plastic plate 58' that extends the full length of the channel 42'. In addition, the spring plate 54' is moved to the back side of the end piece 34 so it does not prevent the operator from seeing if a collar is in the install position. A variable bleed regulator 72 may be placed on the back of the end piece 34' to adjust air pressure in the channel 42' separately from the pressure in the magazine 32. Alternatively, small bleed holes may be drilled into plate 58' to reduce air pressure in channel 42'.

The working end of track pieces 34 and 34' are notched to form top and bottom U-shaped openings 43. The top opening 43 may be chamfered as shown. The vertical height of channels 42 is such as to accommodate therebetween the collars 28 with the axis of the throughhole oriented in such a way as to extend through the U-shaped openings 43 in the end of channels 42. Plate 58 is trifurcated at the right end as shown in FIG. 4B to form the spring 54 that wraps around the side of a collar 28 at the top of the queue to prevent it from going beyond the presentation position at the end of the queue until the operator pulls the tool away from a lockbolt onto which a collar has been placed. The spring is flexible enough to allow this release function, but not so flexible as to allow collars to be blown out by air pressure alone. The springs 54 and 54' have enough flexibility along their length such that as the worker pulls the feeder tool 10 away from the lockbolt shank on which a collar 28 in the staging area has been placed, and the swaging tool 30 has been brought into place immediately below the collar, the springs 54 and 54' release the installed collar allowing the swaging tool 30 to be pushed fully into place around the collar to carry out the swaging operation. The next collar in the queue passage 42 moves into position at the end of piece 34 or 34'.

Figure 6:
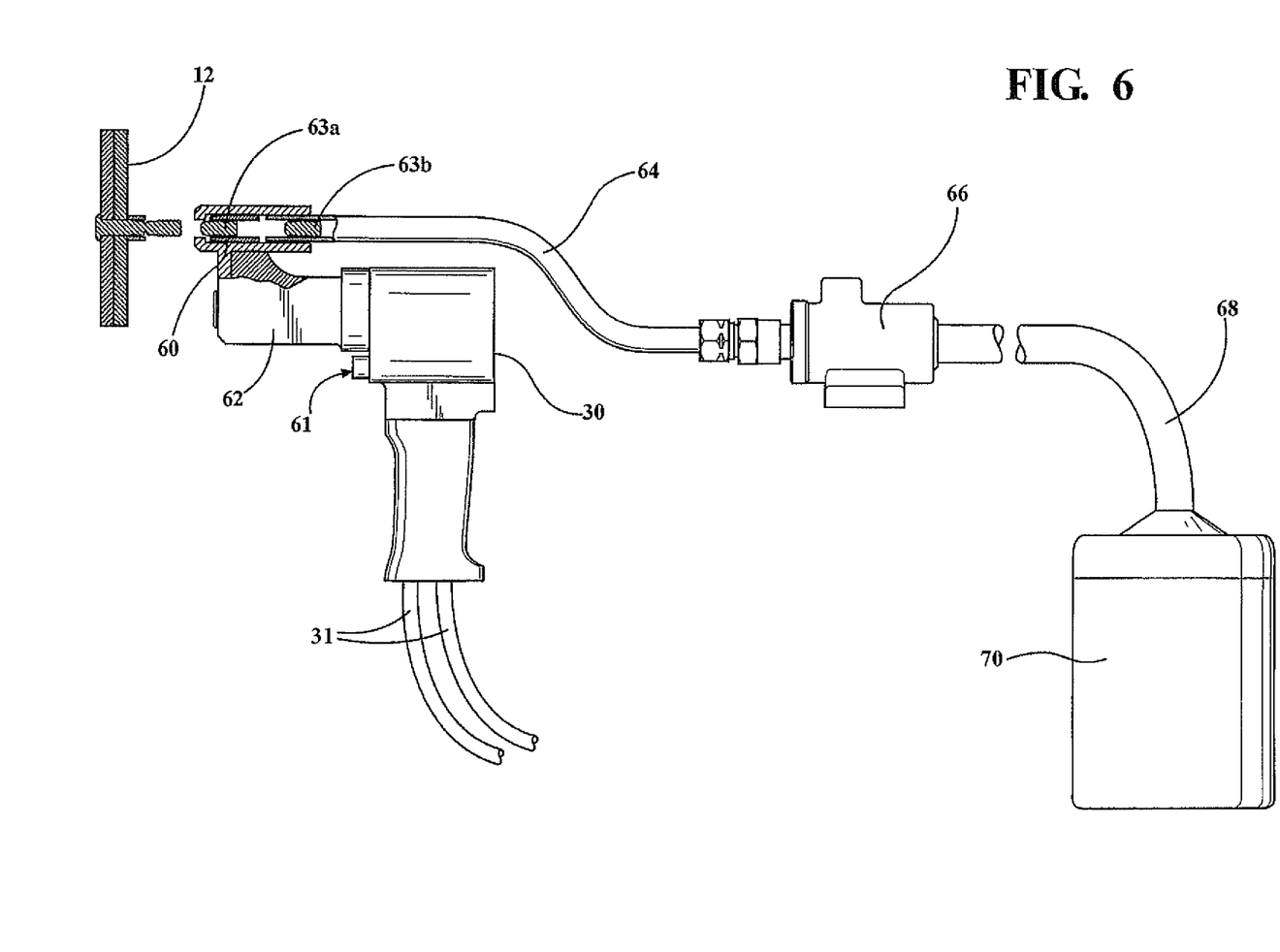
FIG. 6 is a schematic diagram of a swaging tool with a vacuum-operated pintail collection feature.

Looking to FIG. 6, the swaging/pintail fracturing tool 30 may take any of a variety of forms. A suitable ejector-type tool is available from Gage Bilt, Inc. of Clinton Township, Mich. and is identified as the GB204SHRB installation tool. The tool has air lines 31 connected to a power unit to operate a cylinder that controls a collet and a puller in body 62, a known manner by operating a trigger 61. Jaws 60 hold a broken-off pintail 63a until the tool 30 is applied to the next lockbolt. At this time, the entering pintail displaces the pintail 63a to the position of pintail 63b at which time it is pulled through vacuum conduit 64 by vacuum from a generator 66. The vacuumed pintail goes through the generator 66 and a second conduit 68 which empties into a container 70 that can be emptied from time to time.

During the process of collar installation described above, the pintails of the lockbolts 16 are fractured off of the shanks of the lockbolts 16 since they are not needed as part of the installed fastener. In normal circumstances, the fractured pintails are simply ejected through the tool 30. In the system of FIG. 7, the broken-off pintails are collected and deposited in a container 70 for disposal.

In summary, the feeder tool 10 or 10' allows a worker to perform a staging function for collars, one at a time, in such a way as to make it easy for the worker to locate those collars, one at a time, on the extending shanks of lockbolts 16. This eliminates the practice of hand-placing the collars on a number of lockbolt shanks prior to the application of a swaging tool. After the feeder tool 10 or 10' has been used to locate a collar onto a lockbolt shank, the swaging tool 30 is brought into place. The feeder tool 10 or 10' is withdrawn, the tool 30 is pushed further onto the shank and the collar is swaged onto the lockbolt shank as described above. The broken-off pintail goes into the ejection chamber of the tool 30, forcing the previously broken-off pintail through the tool and into the vacuum system where it is swept into the container 70 for safe and organized disposal at a later time. This process continues until the feeder queue in end piece 34 or 34' is empty. The operator then refills the queue with as many collars as he or she feels comfortable installing in a single cycle. The large magazine tube 32 provides a much longer queue, which the worker needs to refill only after a large number of cycles have been carried out. The worker may perform the foregoing process with tool 10 or 10' in one hand and tool 30 in the other hand. As each collar is put in place on a lockbolt shank, another collar takes its place in the presentation queue. The pintail in the tool causes the previously gripped pintail to be pushed into the vacuum conduit 64 where it is taken to the container 70.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, tools 10 and 10' may be reconfigured to align the magazine channel with the tool queue so that one trigger activation fills the entire tool queue, thus eliminating the need for repeated triggering action. In this case, the slidebolts simply block or unblock the route from magazine to hand tool as the worker wishes.

What is claimed is:

1. An apparatus comprising:
   a handheld tool for holding lockbolt collars in a working queue having a collar inlet and presenting each lockbolt collar at an endpoint for placement on a shank of a respective lockbolt, each lockbolt collar having an axial length and an axial through-hole;
   a magazine for holding lockbolt collars in a supply queue, attachable to the tool, wherein the magazine, when attached to the tool, has a collar outlet within the tool adjacent to but overlappingly offset from the collar inlet of the working queue by a distance at least as great as the length of a collar; and
   a manually operable trigger mechanism in the tool having a structurally continuous plunger mounted in a channel transversely intersecting both the supply and working queues in the overlapping portions thereof and having an end surface displaceable through said channel by manual activation for selectively transferring lockbolt collars from the collar outlet of the magazine to the collar inlet of the working queue;

said plunger being biased to a first position outside of both the supply and working queues to allow a collar in the supply queue to enter the channel, but manually displaceable to a second position in which said plunger blocks the supply queue to prevent entry of a collar from the supply queue from entering into the channel, said plunger in said first position being clear of the working queue and the supply queue so as to push a collar into the working queue when manually depressed.

2. The apparatus of claim 1 wherein the magazine is a hollow flexible tube with an interior cross-section designed to hold the lockbolt collars in a side-by-side relationship with the axial through-holes in parallel.

3. The apparatus of claim 2 wherein the tool includes an interior channel with an interior cross-section designed to hold the working queue of lockbolt collars in a side-by-side relationship with the axial through-holes in parallel wherein a number of lockbolt collars in the supply queue is substantially greater than a number of lockbolt collars in the working queue.

4. The apparatus of claim 3 wherein the tool includes a working end configured to hold the lockbolt collars individually in a presentation position relative to said endpoint wherein the axial opening of a lockbolt collar is exposed to allow attachment of the lockbolt collar to the shank of a lockbolt.

5. The apparatus of claim 4 further including a curved retainer spring mounted to the working end of the tool to hold the lockbolt collar in the presentation position and to release the lockbolt collar when the tool is pulled away from the shank onto which the lockbolt collar has been located.

6. The apparatus of claim 2 wherein a source of air pressure is connected to the magazine to urge the lockbolt collars in the magazine toward the trigger mechanism.

7. The apparatus of claim 6 wherein air pressure from said source is communicated to the working queue to urge the lockbolt collars in the working queue toward said endpoint.

8. The apparatus of claim 7 further comprising means for regulating the air pressure in the working queue relative to the air pressure in the supply queue.

9. The apparatus of claim 1 wherein the tool is configured such that a length of the working queue is between five and fifteen collars.

10. The apparatus of claim 1 wherein the working queue is covered by a transparent cover.

11. The apparatus of claim 1 wherein the trigger mechanism comprises an inlet connected to receive the lockbolt collars from the magazine and an outlet connected to discharge the lockbolt collars into the working queue, the inlet and outlet being offset from one another.

12. The apparatus of claim 11 wherein the trigger mechanism further comprises a spring-loaded slide located between the inlet and the outlet to transfer individual lockbolt collars from the supply queue to the working queue without changing an orientation thereof.

13. The apparatus of claim 1 wherein the trigger mechanism comprises a spring biased plunger located between the supply queue and the working queue and configured to be operated by an operator's index finger.

14. A feeder tool for supplying lock bolt collars of the type having an axial through-hole to an end point for placement on a lockbolt shank comprising:
   a handheld feeder for holding multiple collars in a working queue and presenting collars at an end point for direct slide on placement on a lockbolt shank;
   a magazine separate from but attachable to the feeder for holding multiple collars in a supply queue wherein said supply queue extends to a transfer point adjacent to, but overlappingly offset from the working queue by a distance greater than the length of a collar; and
   a manually operable trigger mechanism in the feeder tool having a solid plunger mounted in a channel transversely intersecting both the supply and working queues in the overlapping portions thereof and having an end surface normally biased to a first plunger position wherein said end surface is clear of both the supply queue and the working queue thereby to allow a single collar to enter the channel while remaining offset from the working queue, said plunger being displaceable through said channel to a second position in which the plunger blocks the movement of collars from the supply queue into the channel but which further urges a collar previously occupying the channel when the plunger is in the first position to be displaced to the working queue thereby selectively pushing collars one at a time from the supply queue to the working queue, said working queue operating under unidirectional air pressure to move the collars in a direction toward the end point.

* * * * *